United States Patent [19]

Sano et al.

[11] Patent Number: 4,964,481
[45] Date of Patent: Oct. 23, 1990

[54] STEERING SYSTEM FOR VEHICLES

[75] Inventors: Shoichi Sano, Tokyo; Yoshimi Furukawa; Tetsuro Hamada, both of Tochigi, all of Japan

[73] Assignee: Honda Giken Kogyo Kabushiki Kaisha, Tokyo, Japan

[21] Appl. No.: 690,167

[22] Filed: Jan. 10, 1985

Related U.S. Application Data

[63] Continuation-in-part of Ser. No. 684,613, Dec. 21, 1984.

[30] Foreign Application Priority Data

Jan. 13, 1984 [JP] Japan .................................. 59-4597
Jan. 13, 1984 [JP] Japan .................................. 59-4598
Jan. 13, 1984 [JP] Japan .................................. 59-4599
Jan. 13, 1984 [JP] Japan .................................. 59-4600

[51] Int. Cl.$^5$ .................................................. B62D 5/06
[52] U.S. Cl. .................................... 180/140; 180/142
[58] Field of Search ............... 180/140, 141, 142, 143, 180/234, 236, 79.1; 364/424, 425; 280/91

[56] References Cited

U.S. PATENT DOCUMENTS

| | | | |
|---|---|---|---|
| 3,903,983 | 9/1975 | Yeske | 180/140 |
| 3,933,215 | 1/1976 | Scheuerle | 180/140 X |
| 4,175,638 | 11/1979 | Christenson | 180/140 |
| 4,315,555 | 2/1982 | Schritt | 180/140 |
| 4,412,594 | 11/1983 | Furukawa et al. | 180/140 |
| 4,418,780 | 12/1983 | Ito et al. | 180/142 |
| 4,473,128 | 9/1984 | Nakayama et al. | 180/142 |
| 4,527,654 | 7/1985 | Shibahata et al. | 180/140 |

FOREIGN PATENT DOCUMENTS 53-40930  4/1978  Japan .................................. 180/140

*Primary Examiner*—Mitchell J. Hill
*Attorney, Agent, or Firm*—Irving M. Weiner; Joseph P. Carrier; Pamela S. Burt

[57] ABSTRACT

A steering system for a vehicle with a steerable front wheel (5) and a rear wheel (11) controlled to be steered in accordance with a travelling state representative quantity ($\delta_f$, V, $\alpha_a$), wherein the rear wheel is steered taking into account at least a ratio of a cornering power (Kr) thereof to a vertical load on the tire thereof, besides the travelling state representative quantity.

12 Claims, 6 Drawing Sheets

STEERING SYSTEM FOR VEHICLES

This application is a continuation-in-part application of U.S. patent application Ser. No. 684,613 filed Dec. 21, 1984.

BACKGROUND OF THE INVENTION

1. Field of the Invention

The present invention relates to a steering system for vehicles, and particularly, to a steering system for vehicles of the type in which rear wheels are steered in conjunction with the steering operation of front wheels.

2. Description of Relevant Art

There has been proposed, in U.S. Pat. No. 4,412,594, a steering system for vehicles in which rear wheels are steered in conjunction with the steering operation of front wheels, so as to be turned in the same direction as the front wheels at relatively high vehicle speeds and in the opposite direction thereto at relatively low vehicle speeds.

According to the above steering system, at low speeds, the minimum turning radius as well as the trace gap of the inside wheels is greatly decreased, thus remarkably improving the vehicle turning characteristics such as when parking, travelling along a narrow winding road, effecting a U-turn, and driving at high speeds, a homodirectional steering of the rear wheels relative to the front wheels provides enhanced steering responsiveness, so that, for example, lane changes and the like may be performed more adeptly.

Incidentally, while a vehicle is making a turning motion, each grounded wheel of the vehicle is subjected to a certain cornering force (hereinafter called "force Fc") which is a force produced at a grounded portion of a tire to oppose a centrifugal force which appears when the wheel is slipping in accordance with the turning motion, as well known in the relevant art.

The force Fc has such a relation to a slip angle as will be briefly described below with reference to FIGS. 14 to 18 of the accompanying drawings, cited from published materials. To simplify the description, forces other than the force Fc are not given in FIGS. 14 to 18 of the drawings, whereas when a grounded wheel is slipping a tire of the wheel is always subjected to a rolling-frictional force and a self aligning torque. Moreover, in the case of a grounded wheel with a camber angle, a camber thrust is acting on the wheel. Further, the grounded wheel undergoes a braking force from time to time, in addition to a drive force to be voluntarily given in the case where the wheel is a drive wheel. In the description, the wheel is assumed to be a wheel with an air-tubed rubber tire.

FIG. 14 is a plan view showing a wheel 400 of a vehicle (not shown), as it is turning. The wheel 400 has a moving direction B thereof deviated from a rolling direction A thereof by a slip angle $\beta$, or in other words, it is rolling with the slip angle $\beta$ (hereinafter called "angle $\beta$"), causing the vehicle to turn clockwise. In such a state, at a grounded surface (not shown) of a tire, due to the friction between a road surface (not shown) and a tread surface (not shown) of the tire, there is produced a centripetal force perpendicular to the moving direction B, that is, in a direction toward the center of turn, which is the force Fc.

As well known, a characteristic on which a tire of a vehicle depends when making a motion with a slip while the vehicle is turning, that is, what is called a cornering characteristic of the tire, is principally governed by such factors as: (1) the material as well as the constitution and configuration of the tire; (2) a vertical load on the tire; (3) an air pressure of the tire; and (4) the condition of road surface.

With the material as well as the constitution and configuration of the tire now assumed as already given, there will be briefly described a number of relations among other factors (2) to (4) above, the force Fc, and the angle FIG. 15 shows a plot of a relation of the force Fc to the angle $\beta$. As seen from the plot, although the relation between the force Fc and the angle $\beta$ is substantially linear when the angle $\beta$ is small, the ratio of increase in the force Fc to that in the angle $\beta$ gradually decreases, as the angle $\beta$ increases beyond a certain value thereof.

With respect to the range in which the Fc vs. $\beta$ relation is substantially linear, the ratio of an increment $\Delta Fc$ of the force Fc to an increment $\Delta\beta$ of the angle $\beta$, that is, $\Delta Fc/\Delta\beta$, is known as a cornering power K which is an important factor to estimate the cornering characteristic of the tire. The cornering power K varies depending on various conditions such as the air pressure of the tire, a load on the grounded portion of the tire, and the road surface condition.

FIG. 16 provides a plot of a relation between a ratio of the force Fc to the vertical load of the tire represented by W, that is, Fc/W, and the angle $\beta$. The vertical load W is known to be always effective in the form of $\mu W$ on the cornering characteristic, where $\mu$ is a coefficient of friction of the tire with respect to the road surface, and therefore also the coefficient $\mu$ of friction has a similar effect thereon, as will be understood from the plot.

FIG. 17 is a graph similar to FIG. 16, while being different therefrom in that the axis of ordinate does not represent the ratio Fc/W, but the force Fc itself. Incidentally, with respect to a grounded wheel adapted to be steerable, the angle $\beta$ is generally dependent on an actual steering angle and a travelling speed V as well as on other associated conditions. In this respect, when such a wheel is slipping with an angle, the force Fc thereof has a unique value dependent on the angle $\beta$, provided that such conditions other than the actual steering angle and the travelling speed V are constant, as seen from the graph.

FIG. 18 shows a relation between the cornering power K and the air pressure of the tire as represented by P. As will be understood from this drawing, the cornering power K increases with an increase in the air pressure P, such that the pressure P has a considerable effect on the cornering power K, whereas excessive air pressures will not be substantially effective to increase the cornering power K.

Incidentally, it will also be understood from FIG. 15 that, like the case of the relation to the air pressure P shown in FIG. 18, the cornering power K tends to increase with an increase in the vertical load W, whereas it is also known that excessive loads cause the cornering power K to decrease.

As will be understood from the foregoing description of the cornering characteristic, it is desirable to control the steering of wheels of a steering system according to the before-mentioned prior art in consideration of various travelling state representative quantities of the wheels.

Concretely speaking, conventional steering systems tend to understeer or oversteer while turning, and it is desirable to eliminate such tendency. Particularly, a vehicle with a conventional steering system tends to outwardly slip at the rear part thereof, thus exhibiting an oversteer effect, when the force Fc of rear wheels is smaller than an ordinary value thereof and, to the contrary, to exhibit an understeer effect when the force Fc is larger than the ordinary value, such tendency is desired to be eliminated.

Speaking more particularly, it is preferable to make the steering control in consideration of the cornering power K directly representing the relation between the force Fc and the angle $\beta$, or in other words, taking into account the coefficient $\mu$ of friction between tire and road surface, the vertical load W, or the air pressure P of the tire, which have their effects on the magnitude of the cornering power K.

From such points of view, the present invention has been achieved to further improve a conventional steering system for vehicles of the above-described type.

SUMMARY OF THE INVENTION

According to the present invention, there is provided a steering system for a vehicle with a steerable front wheel and a steerable rear wheel, comprising a front wheel steering mechanism for steering the front wheel, and a rear wheel steering mechanism for steering the rear wheel taking into account a travelling state quantity of the vehicle. The rear wheel steering mechanism comprises an actuation means for actuating the rear wheel, a detection means for detecting the travelling state quantity, and a control means connected to the detection means and adapted to supply a control signal to the actuation means, the control means consisting of a first process means receiving an output signal from the detection means to produce a first signal representing an ordinary steering angle for the rear wheel, a second process means for deriving data relating to at least a cornering power of the rear wheel and for producing a second signal for correcting the first signal on the basis of the data, and a synthesizing means for synthesizing the first signal and the second signal to produce the control signal.

Accordingly, an object of the present invention is to provide a steering system for a vehicle with a steerable front wheel and a steerable rear wheel, which always permits a stable steering operation as well as enhanced turning characteristic even when the ratio of a cornering power to a vertical load on a wheel of the vehicle is increased or decreased with a variation in various associated conditions due to the vehicle itself or is externally caused.

The foregoing and additional objects and features of the present invention, as well as advantages thereof, will more fully appear from the following detailed description of preferred embodiments of the invention when the same is read in conjunction with the accompanying drawings.

DETAILED DESCRIPTION OF THE PREFERRED EMBODIMENTS

Figure 1:
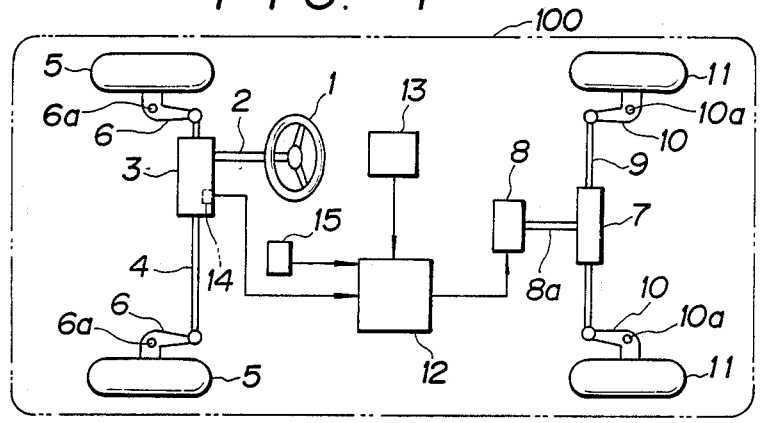
FIG. 1 is a schematic plan view showing a vehicle equipped with a steering system according to a first embodiment of the invention.

Referring first to FIG. 1, designated at reference numeral 1 is a steering wheel of a vehicle 100 shown by the dashed line. A steering shaft 2 of the steering wheel 1 is assembled at the lower end thereof into a gear box 3 of a rack and pinion type, so that a tie rod 4 is transversely movable to the left and right in accordance with a turning operation of the steering wheel 1. The tie rod 4 is connected at the left and right ends thereof to left and right knuckle arms 6, 6 supporting left and right front wheels 5, 5, respectively, which arms 6, 6 are pivoted at their pivot points 6a, 6a on the side of a body (not shown) of the vehicle 100, whereby the front wheels 5, 5 are adapted to be steered in the same direction as the turning of the steering wheel 1.

On the other hand, in the rear part of the vehicle 100, there is provided another gear box 7 of a rack and pinion type, to which a shaft 8a rearwardly extending from a rear wheel steering servo-actuator 8 is connected at the rear end thereof. Moreover, through the gear box 7, there is provided a transversely movable tie rod 9 pivotably connected at the left and right ends thereof to left and right knuckle arms 10, 10 supporting left and right rear wheels 11, 11, respectively, . which arms 10, 10 are pivoted at their pivot points 10a, 10a on the vehicle body side, whereby like the steering of the front wheels 5, 5 the rear wheels 11, 11 are adapted to be steered in accordance with a transverse displacement of the tie rod 9 due to a controlled rotation of the shaft 8a.

The vehicle has mounted thereon a microcomputer 12 provided with a lateral acceleration sensor 13 for detecting an acceleration $\alpha_d$ in the lateral direction of the vehicle, a front wheel steered-angle sensor 14 for detecting a steered angle $\delta_f$ of the front wheels 5, 5, and a vehicle speed sensor 15 for detecting a speed V of the vehicle. The computer 12 receives respective detection signals $\alpha_0$, x, and y of the sensors 13, 14, and 15 and, depending thereon, supplies a control signal to the servo-actuator 8, to thereby effect a necessary steering of the rear wheels 11, 11, that is, thereby controlling to steer the rear wheels 11, 11 fundamentally in the same direction as the front wheels 5, 5 at relatively high values of the vehicle speed V and in the opposite direction thereto at relatively low values of the speed V.

In the foregoing arrangement, the gear box 3 as well as the tie rod 4 and the knuckle arms 6, 6 cooperates with the steering wheel 1 and the steering shaft 2, to function therewith as a part of a front wheel steering mechanism for steering the front wheels 5, 5. On the other hand, the gear box 7 as well as the tie rod 9 and the knuckle arms 10, 10 cooperates with the computer 12 receiving the detection signals of the respective sensors 13, 14, 15 to output the control signal, the actuator 8 controlled by the computer 12, and the output shaft $8a$ of the actuator 8, to function t herewith as a part of a rear wheel steering mechanism for steering the rear wheels 11, 11.

Next, with reference to FIGS. 2 to 4, there will be described below the constitution as well as the function of a control part of the above-described steering system according to the first embodiment of the invention.

Figure 2:
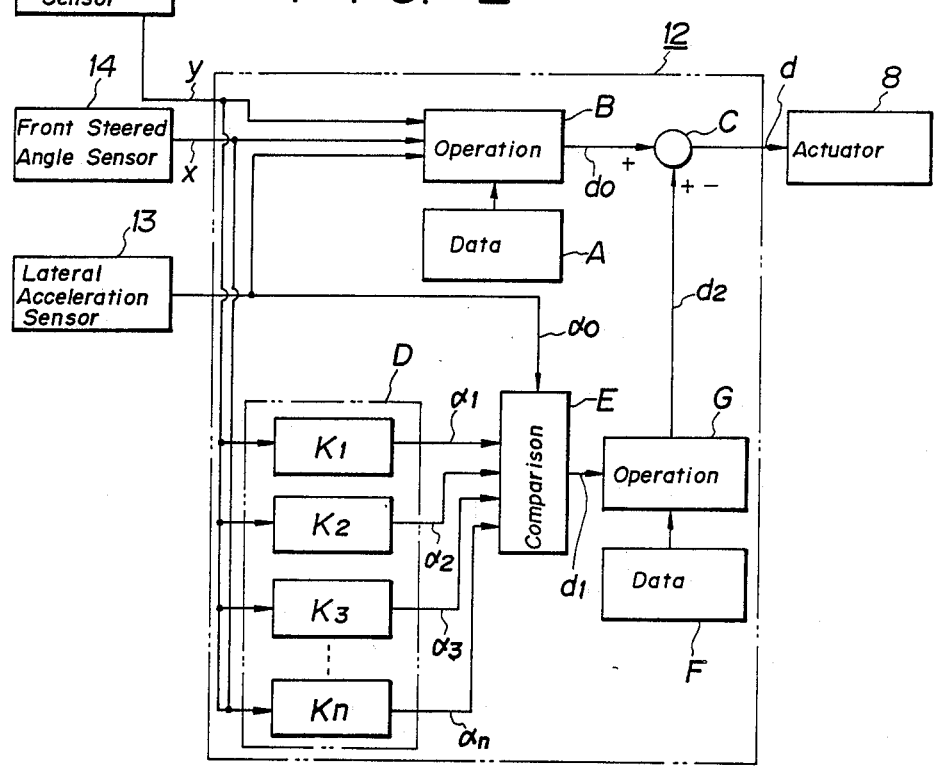
FIG. 2 is a functional block diagram of a control part of the steering system of FIG. 1.

Firstly, in FIG. 2, there is shown the computer 12, to which are connected the respective sensors shown in FIG. 1, that is, the lateral acceleration sensor 13, the steered angle sensor 14 of the front wheels 5, 5, and the vehicle speed sensor 15. The results of detection of the sensors 13, 4, 15 are processed in the computer 12 by an operation B on the basis of data A stored in advance, to obtain a rear wheel steering data signal $d_0$ corresponding to the detection results.

The data signal $d_0$ is to be subjected to a later-described synthesis process C as an addition process, before being output as the before-mentioned control signal designated at reference character d to the actuator 8, where it is subjected to a digital to analogue conversion and amplified to drive a servo-motor (not shown) for causing the shaft $8a$ to revolve to thereby steer the rear wheels 11, 11. In this respect, it should be noted that, when directly passed as the signal d to the actuator 8 without being subjected to the process C, the signal $d_0$ can steer the rear wheels 11, 11 in the same way as in the case of the before-described prior art.

On the other hand, the actual steered angle $\delta_f$ and the vehicle speed V detected, as factors representing a travelling state of the vehicle, by the steered angle sensor 14 and the vehicle speed sensor 15, in the form of the signals x and y, respectively, are processed in the computer 12 through a conversion process D, where they are converted into a plurality of probable values $K_1$ to $K_n$ of the cornering power K.

The principle of the conversion will now be described, with reference to FIG. 15. As described before, the cornering power K is defined such that $K=\Delta Fc/\Delta \beta$. In this respect, the slip angle $\beta$ has a certain relation to the steered angle $\delta_f$, so that, for a given value of the vehicle speed V, the angle $\beta$ can be obtained from the angle $\delta_f$ on the basis of empirical data collected in advance. Moreover, with respect to the cornering force Fc, a relation is known such that $Fc=K\cdot\beta$ and $Fc=m\cdot\alpha$, where m is the weight of the vehicle and $\alpha$ is the lateral acceleration. Since the angle $\beta$ and the weight m can be given, it is possible to compute a plurality of values $\alpha_1$ to $\alpha_n$ of the lateral acceleration $\alpha$ corresponding one-to-one to the probable values $K_1$ to $K_n$ of the cornering power K.

Referring again to FIG. 2, the actual lateral acceleration $\alpha_a$ as a travelling state representative factor of the vehicle has a particular value thereof detected, in the form of the measured lateral acceleration data signal $\alpha_0$, by the lateral acceleration sensor 13. The measured lateral acceleration data signal $\alpha_0$ is subjected to a comparison process E, where the computed data $\alpha_1$ to $\alpha_n$ of the lateral acceleration $\alpha$ are compared with the actual lateral acceleration $\alpha_a$ to select one $\alpha_i$ (the suffix "i" of $\alpha$ representing an arbitrary integer between and including 1 and n) most approximate to the actual value $\alpha_a$, to thereby determine to a corresponding one $K_i$ (the suffix "i" of K representing an arbitrary integer between and including 1 to n) of the cornering powers $K_1$ to $K_n$, which one $K_i$ is assumed to be an actual value $K_\gamma$ of the cornering power K.

The cornering power $K_\gamma$ as thus derived is processed in the form of a data signal $d_1$ to be subjected to a later-described operation G to obtain, on the basis of data F stored in advance, another data signal $d_2$ representing a necessary correction of the steering of the rear wheels 11, 11 corresponding to the signal $d_1$ as the actual cornering $K_\gamma$. The correction data signal $d_2$, which has a positive or negative sign to identify the direction of correction, is then subjected to the synthesis process C as an addition process, where it is added to the rear wheel steering data signal $d_0$ before being fed to the servo-actuator 8.

The above-mentioned operation process G will now be described more concretely. The process G is adapted to produce, when the ratio of the cornering power $K_\gamma$ to the vertical load of the tire is decreased to be smaller than a predetermined value with an excessive increase of the vertical load of the tire such as due to loaded luggage or principally by a reduction of the air pressure P of the tire, the correction data signal $d_2$ so as to additionally steer the rear wheels 11, 11 in the same steering direction as the front wheels 5, 5 by a given corrective steering angle, to thereby increase the slip angle $\beta$ of each rear wheel 11 from an ordinary position it is to have when steered depending on the rear wheel steering data signal $d_0$ only.

Figure 3:
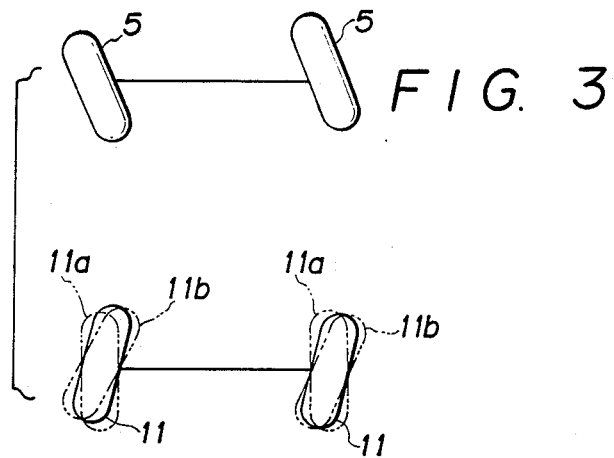
FIG. 3 is a schematic plan view of front and rear wheels of the vehicle as steered by the steering system of FIG. 1.

Namely, in a case without the process C, in which the signal $d_2$ is unable to be added to the signal $d_0$, the rear wheels 11, 11 are to have their ordinary positions shown in FIG. 3 by the solid line. According to the first embodiment, however, when the ratio of the derived cornering power $K_\gamma$ to the vertical load is smaller than the predetermined value, the rear wheels 11, 11 are so steered as to have their corrected positions $11a$, $11a$ shown by the alternate long and two short dashes line, FIG. 3, by virtue of the signal $d_2$ as added to the signal $d_0$ following the function of the synthesis process C. Incidentally, in FIG. 3, the front wheels 5, 5 have their steered positions corresponding to a relatively low value of the vehicle speed V.

In the above functional description, for effecting an additional steering of the rear wheels 11, 11, the correction data signal $d_2$ is so produced on the basis of the stored data F that an actual steered angle $\delta_r$ of the rear wheels 11, 11 as finally given can prevent unnecessary fishtailing motions at the rear part of the vehicle.

On the contrary, when the ratio of the cornering power $K_\gamma$ to the vertical load has become larger than the predetermined value, then the correction data signal $d_2$ is so produced as to additionally steer the rear wheels 11, 11 in the opposite steering direction to the front wheels 5, 5 by a given corrective steering angle, to thereby decrease the slip angle $\beta$ of each rear wheel 11 from the ordinary position it is to have when steered depending on the rear wheel steering data signal $d_0$ only.

Namely, contrary to the case of smaller ratios of the cornering power $K_\gamma$ to the vertical load than the predetermined value, when the ratio of $K_\gamma$ to the vertical load is larger than the predetermined value, the signal $d_2$ is produced in such a way that the rear wheels 11, 11 are to be steered to their corrected positions 11b, 11b shown in FIG. 3 by dashed line.

Also in this case, the correction data signal $d_2$ is determined, based on the data F as preset to be stored, so that the actual steered angle $\delta_r$ of the rear wheels 11, 11 can permit the operation of the steering wheel 1 to provide a normal trace for the turning travel of the vehicle.

In this embodiment, as well as in the later-described three other embodiments of the invention, the steering control of the rear wheels 11, 11 is based on such a concept or object that, while a vehicle is turning, when the ratio of an actual cornering power $K_\gamma$ to a vertical load on the tire of a rear wheel of the vehicle is reduced to be smaller than a predetermined value, the cornering characteristic should be prevented from having an oversteer effect by additionally increasing the slip angle $\beta$ of the rear wheel to increase the cornering force Fc thereof and, when the ratio of the cornering power $K_\gamma$ to the vertical load is larger than the predetermined value, it should be prevented from becoming excessive of understeer by additionally decreasing the slip angle $\beta$ of the rear wheel; that is, so that the steering control of a rear wheel of a vehicle should be made in consideration of various travelling state representative quantities of the vehicle.

In this respect, it should be noted that, as well known, most general purpose vehicles have their cornering characteristics factory-set so as to have an understeer effect.

In the foregoing arrangement, the computer 12 comprises a microcomputer system including various integrated circuits (not shown) for achieving necessary functions, such as in the form of a CPU, a ROM, a RAM, a number of peripheral interfaces, etc.

The microcomputer system is adapted to compute a cornering power of the tire in the turning travel of the vehicle and, depending thereon, to additionally control the steered angle of the rear wheels 11, 11, thereby setting an optimum rear wheel steering angle for an actual travelling state the vehicle then has. Respective processes therefore in the computer system are exercised following a later-described control program as a software stored in advance in the ROM as a memory. In this respect, instead of the computer 12, there may be employed a plurality of electric circuits with similar functions.

Figure 4:
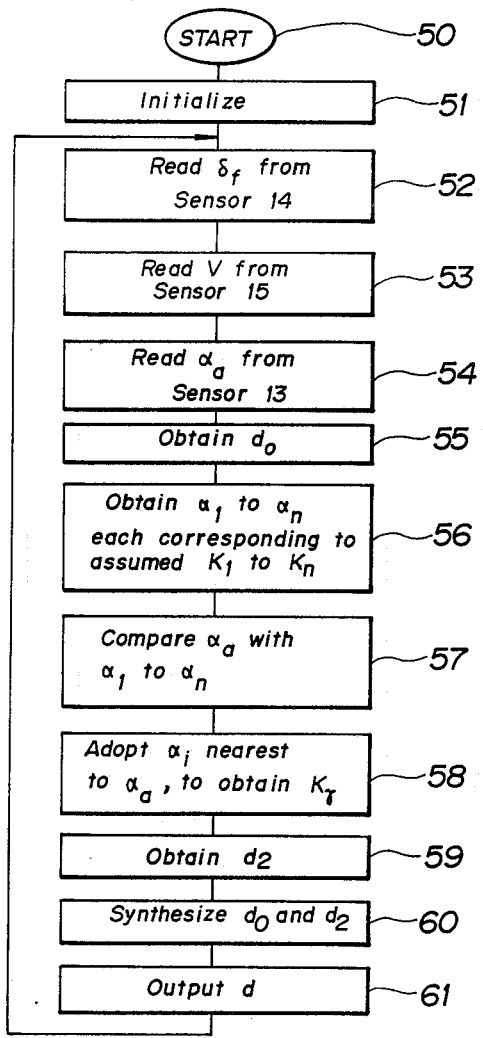
FIG. 4 is a schematic flow chart of a program for a microcomputer system of the control part of FIG. 2.

FIG. 4 is a schematic flowchart of the program stored in the memory (ROM) of the microcomputer system.

As can be seen from FIG. 4, the program starts at a stage 50 when the microcomputer system is powered on or reset, and goes to an initializing stage 51 for initializing the peripheral interfaces and setting necessary variables.

Thereafter, the program flow enters a base loop comprising a plurality of stages 52 to 61.

At the first stage 52 of the base loop, the detection signal x of the steered angle sensor 14 of the front wheels 5, 5 is input to read the actual steered angle $\delta_f$ of the front wheels 5, 5, and at a stage 53, the detection signal y of the vehicle speed sensor 15 is input to read the vehicle speed V. Moreover, at a stage 54, the detection signal $\alpha_0$ of the lateral acceleration sensor 13 is input to read the actual lateral acceleration $\alpha_a$ and, at a subsequent stage 55, like the case of the before-mentioned prior art, the rear wheel steering data signal $d_0$ is obtained from the front wheel's actual steered angle $\delta_f$, the vehicle speed V, and the actual lateral acceleration $\delta_a$.

Next, at a stage 56, the actual steered angle $\delta_f$ and the vehicle speed V as given are processed to compute therefrom the forecast values $\alpha_1$ to $\alpha_n$, of the lateral acceleration $\alpha$ corresponding one-to-one to the probable values $K_1$ to $K_n$ of the cornering power K. At a stage 57 next thereto, the forecast values $\alpha_1$ to $\alpha_n$ are compared with the actual lateral acceleration $\alpha_a$ to select one $\alpha_i$ most approximate to the actual value $\alpha_a$, to derive therefrom the value $K_\gamma$ assumed as the actual cornering power of the rear wheels 11, 11.

Then, the correction data signal $d_2$ is obtained at a stage 59 from the cornering power $K_\gamma$ on the basis of the data F and, at a subsequent stage 60, synthesized with the data signal $d_2$. The results of synthesis are collected to be output at the last stage 61 of the base loop, in the form of the control signal d being supplied to the actuator 8, thereby steering the rear wheels 11, 11.

In the foregoing description, to achieve a steered angle according to the control signal d, when the rear wheels 11, 11 have been steered actually from a certain steered angle to the angle to be finally achieved, they are usually steered slightly from the initial certain angle. In this respect, although it is required to compare the final angle according to the signal d with an angle before then, in this embodiment such a process is covered with an internal electric circuit (not shown) of the actuator 8.

As will be understood from the foregoing description according to the first embodiment, the steering system for vehicles is successfully kept free from being affected by variations in the cornering power K of the tire due to condition changes such as of the air pressure P of the tire, the load W on the grounded portion of the tire, and the road surface condition, thus always permitting a stable operation of the steering wheel 1 even during a turning travel thus effectively improving the turning characteristics of the vehicle.

Figure 5:
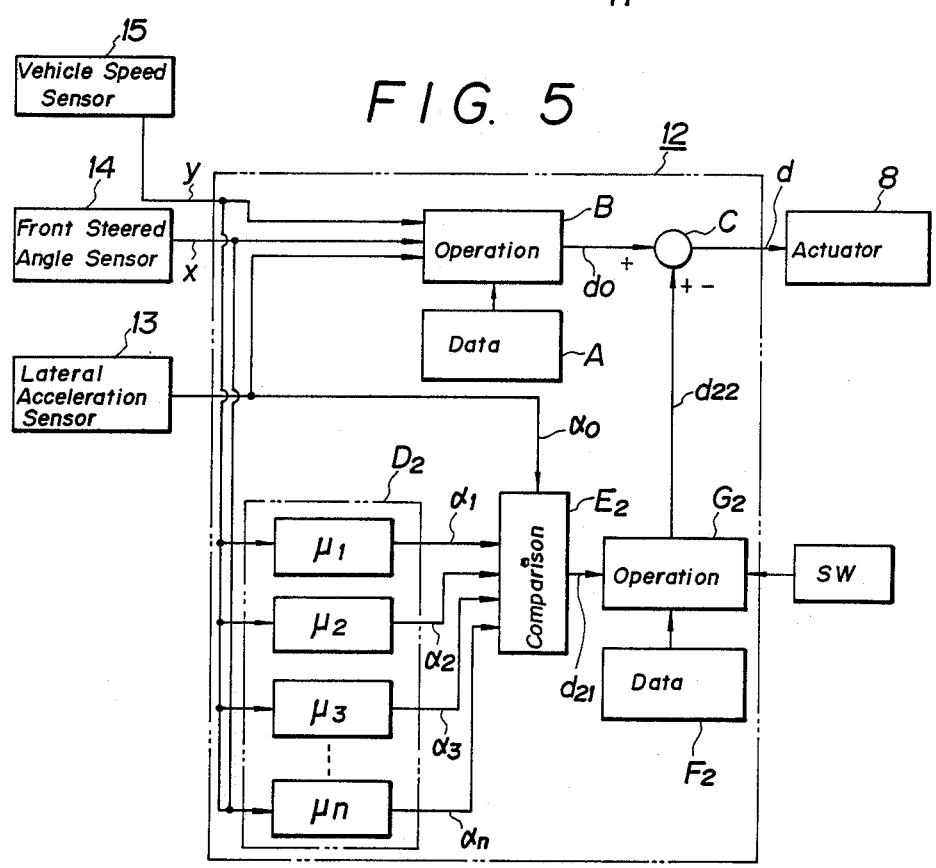
FIG. 5 is a functional block diagram of a control part according to a modified example of the first embodiment.

FIG. 5 is a functional block diagram of a control part of a steering system for vehicles according to a modified example as a modification with respect to the signal processing system of the computer 12 of the first embodiment, in which like parts and processes are designated by like reference numerals or characters in relation to the first embodiment.

In the control part of the modified example, instead of directly determining the cornering power K, a coefficient $\mu$ of friction between the road surface and tire is determined as an alternative parameter indirectly representing the cornering power K.

Namely, in the modified example, an actual steered angle $\delta_f$ of front wheels of a vehicle and a travelling speed V of the vehicle detected, as factors representing a travelling state of the vehicle, by a steered angle sensor 14 and a vehicle speed sensor 15, in the form of signals x and y, respectively, are processed in a microcomputer 12 through a conversion process $D_2$, where they are converted into a plurality of probable values $\alpha_1$ to $\alpha_n$ of a lateral acceleration $\alpha$ of the vehicle corresponding one-to-one to a plurality of computed values $\mu_1$ to $\mu_n$ of the friction coefficient $\mu$.

Figure 6:
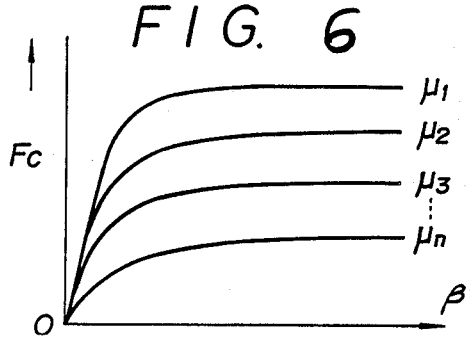
FIG. 6 is a graph for describing the principle of a function of the block diagram of FIG. 5.
Figure 17:
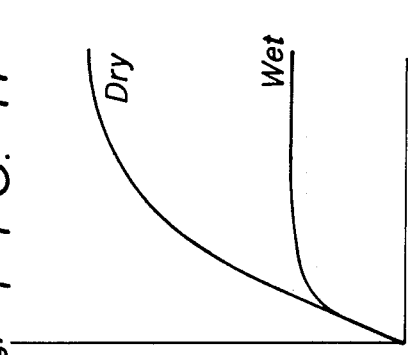
FIGS. 14 to 18 are cited from published materials for the aid of the comprehension of the cornering characteristic of grounded wheel, as described before.
Figure 16:
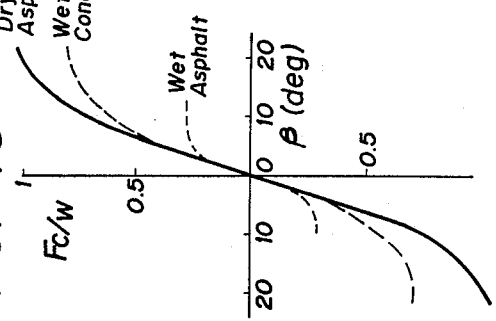

The principle of the conversion will now be described, with reference to FIG. 6 which, similarly to FIGS. 16 and 17, typically illustrates a relation between the cornering force Fc and the slip angle $\beta$ for various values $\mu_i$ (the suffix "i" of $\mu$ being an arbitrary integer in a given region) of the friction coefficient $\mu$ of the vehicle. As seen from FIG. 6, the coefficient $\mu$ decreases as the suffix i increases.

Similarly to the first embodiment, for a given value of the vehicle speed V, the slip angle $\mu$ of the rear wheels can be obtained from the steered angle $\delta_f$ on the basis of empirical data collected in advance. Moreover, as described before, such a relation is known that Fc = m·$\alpha$, where m is the weight of the vehicle. Since the angle $\beta$ and the weight m can be given, it is possible to compute the values $\alpha_1$ to $\alpha_n$ of the lateral acceleration $\alpha$ corresponding one-to-one to the probable values $\mu_1$ to $\mu_n$ of the friction coefficient $\mu$ of the rear wheels.

Referring again to FIG. 5, a lateral acceleration sensor 13 has detected a current value of an actual lateral acceleration $\alpha_a$, as a travelling state representative factor of the vehicle, in the form of a measured lateral acceleration data signal $\alpha_0$. The measured lateral acceleration data signal $\alpha_0$ is subjected to a comparison process E$_2$, where the computed data $\alpha_1$ to $\alpha_n$ of the lateral acceleration $\alpha$ are compared with the actual lateral acceleration $\alpha_a$ to select one $\alpha_i$ most approximate to the actual value $\alpha_a$, to derive therefrom a corresponding one $\mu_i$ of the friction coefficients $\mu_1$ to $\mu_n$, which one $\mu_i$ is assumed to be an actual value $\mu_\gamma$ of the friction coefficient $\mu$.

Incidentally, in a still further modified example, there may be employed a friction coefficient detector or the like adapted for a direct detection of a friction coefficient such as by a contact with the ground.

The actual friction coefficient $\mu_\gamma$ as derived is processed in the form of a data signal $d_{2l}$ to be subjected to a later-described operation G$_2$ to obtain, on the basis of data F$_2$ stored in advance, another data signal $d_{22}$ representing a necessary correction of the steering of the rear wheels corresponding to the signal $d_{2l}$. The correction data signal $d_{22}$, which has a positive or negative sign to identify the direction of correction, is then subjected to a synthesis process C as an addition process, where it is added to an ordinary steering data signal $d_0$ of the rear wheels before being fed to a servo-actuator 8.

The above-mentioned operation process G$_2$ will now be described more concretely. The process G$_2$ is adapted to produce, when the coefficient $\mu$ of friction between the tire and the road surface, which may be frozen, is decreased to be smaller than a predetermined value, the correction data signal $d_{22}$ so as to additionally steer the rear wheels in the same steering direction as the front wheels by a given corrective steering angle, to thereby increase the slip angle $\beta$ of each rear wheel from an ordinary position it is to have when steered depending on the rear wheel steering data signal $d_0$ only.

In the above functional description, for effecting an additional steering of the rear wheels, the correction data signal $d_{22}$ is so produced on the basis of the stored data F$_2$ that an actual steered angle $\delta_r$ of the rear wheels as finally given can prevent unnecessary fishtailing motions at the rear part of the vehicle.

On the contrary, when the coefficient $\mu$ of friction between the tire and the road surface, which may be of a rough concrete-paved road, has become larger than the predetermined value, then the correction data signal $d_{22}$ is so produced as to additionally steer the rear wheels in the opposite steering direction to the front wheels by a given corrective steering angle, to thereby decrease the slip angle $\beta$ of each rear wheel from the ordinary position it is to have when steered depending on the rear wheel steering data signal $d_0$ only.

Also in this case, based on the data F$_2$, the correction data signal $d_{22}$ is produced such that the actual steered angle $\delta_r$ of the rear wheels as finally given can prevent unnecessary fishtailing motions at the rear part of the vehicle.

As well known, variations in the friction coefficient $\mu$ between the road surface and tire have effects on the cornering power of whole grounded wheels of the vehicle. The data F$_2$ are preset in consideration of this point, as a matter of course.

Incidentally, in the steering system according to the modified example, there is provided a select switch Sw to be operated, when desired, to render always smaller than usual the slip angle $\beta$ of each rear wheel as finally given taking into account the correction data signal $d_{22}$ produced by the operation G$_2$. Namely, when the select switch Sw is put in an off position thereof, the computer 12 works in a usual manner as described above. To the contrary, when the switch Sw is turned on, the correction data signal $d_{22}$ is given such that the angle $\beta$ as finally given becomes always smaller than usual, which means the cornering power Fc of the rear wheel is always kept smaller than that to be given when the switch Sw is in the off position.

In other words, while the select switch Sw is turned on, the vehicle tends to be outwardly biased at the rear part thereof when cornering a curve, thus achieving a very sporty feel during travel. In this respect, the select switch Sw is to be left off during normal travel, and to be turned on at the discretion of a driver of the vehicle when travelling along a series of continuous curves.

Such a select switch may be provided in the steering system for vehicles according to the first embodiment as well as in respective steering systems for vehicles according to later-described embodiments of the invention.

Incidentally, as an alternative select switch, there may be employed one which has on and off states thereof interrogated, after the synthesis process C is completed, before outputting the control signal d.

Figure 7:
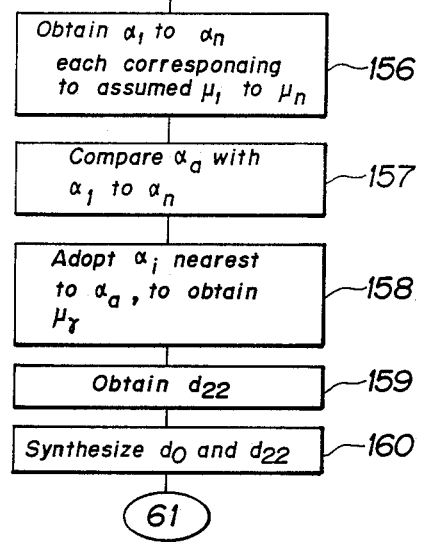
FIG. 7 is a schematic flow chart of an essential part of a program for a microcomputer system of the control part of FIG. 5.

FIG. 7 shows a schematic flowchart of an essential part of a program stored in a memory (not shown) of the microcomputer 12 of the foregoing modified example, including a series of process stages 156 to 160 adapted to serve in place of the stages 56 to 60 of FIG. 4, while the remaining part of the program is substantially the same as that of FIG. 4.

The stages 156 to 160 will be described below, as the select switch Sw is put in the off position. In this respect, in the case where the select switch Sw is in an on position thereof, the correction data signal $d_{22}$ is to be produced at a below-described process stage 159 so as to make the final slip angle $\beta$ of the rear wheel smaller than that to be given when the switch Sw is in the off position.

At the stage 156, the probable values $\alpha_1$ to $\alpha_n$ of the lateral acceleration $\alpha$ corresponding to the forecast values $\mu_1$ to $\mu_n$ of the friction coefficient $\mu$ are obtained from the actual steered angle $\delta_f$ of the front wheels as already given and, at a stage 157, the computed values $\delta_1$ to $\delta_n$ of the lateral acceleration $\alpha$ are compared with the measured actual value $\alpha_a$ thereof as already read, to adopt at a next stage 158 one $\alpha_i$ most approximate to the actual value $\alpha_a$, deriving therefrom the coefficient $\mu\gamma$ of friction between the rear wheel's tire and the ground. Then, at the stage 159, the correction data signal $d_{22}$ is obtained on the basis of the coefficient $\mu\gamma$ and the data $F_2$ and, at the stage 160, the signal $d_{22}$ is synthesized with the ordinary steering data signal $d_0$.

According to the modified example, the steering system for vehicles is successfully kept from being affected by variations in the coefficient $\mu$ of friction between the road surface and tire, so that a stable steering operation can always be achieved such as when passing a hair pin curve or changing a lane, even in the case of a road with a small friction coefficient $\mu$, such as a frozen road, thus favorably facilitating the turning operation of the vehicle.

There will again be referred to hereinbelow the method of deriving a cornering power and a coefficient of friction in the first embodiment and the modified example thereof.

For a given vehicle speed, there can be forecasted a lateral acceleration according to the difference of steered angle between front and rear wheels, as well as tire slip angles of the front and rear wheels, on the assumption of a tire characteristic of the front and rear wheels. As a result, with respect to the tire of at least either of the front and rear wheels, the cornering power and the friction coefficient are computable of their variations on the basis of variations in the relation of the lateral acceleration and the steered angle difference of the front and rear wheels.

According to such a method, an estimation is possible with a remarkable high accuracy while the vehicle is travelling substantially in a steady state. For a transient state, a higher accuracy may be achieved through a numerical approximation by use of a known equation of motion taking into account the rotation with respect to the yaw direction about the center of gravity.

Incidentally, it will be easily understood that the synthesis process C, which is provided as an addition process in the foregoing description, may comprise a multiplication process. In such case, however, at the operation process G or $G_2$, the correction data signal $d_2$ or $d_{22}$ may not be produced as one that represents an additional quantity of steered angle, but a factor which can result in a control signal identical in content to that of the above-described case, when subjected to the multiplication process with the rear wheel's ordinary steering angle data $d_0$.

There will be described below a steering system for vehicles according to a second embodiment of the invention, with reference to FIGS. 8 to 10, in which like parts and processes are designated by like reference numerals or characters in relation to the first embodiment, as in the case of a later-described third embodiment of the invention.

Figure 18:
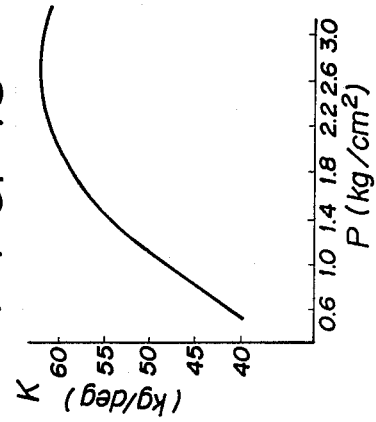

In the second embodiment, as opposed to the first embodiment in which the cornering power K is directly obtained, an air pressure P of the tire is detected to compute therefrom the cornering power K, in consideration of the relation between the cornering power K and the air pressure P of tire shown in FIG. 18, thereby realizing favorable control of rear wheel steering.

Figure 8:
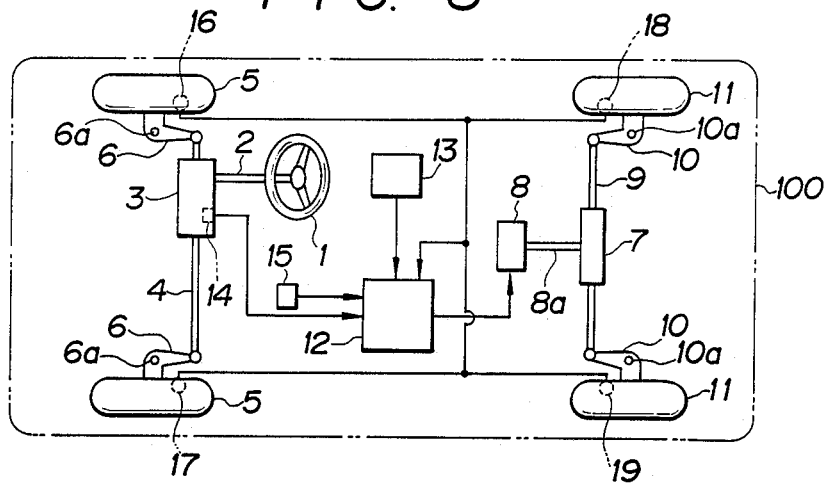
FIG. 8 is a schematic plan view showing a rough constitution of a vehicle equipped with a steering system according to a second embodiment of the invention.

Referring now to FIG. 8, in the second embodiment, in addition to a lateral acceleration sensor 13, a steered angle sensor 14 of the front wheels 5, 5, and a vehicle speed sensor 15, there are provided two pairs of air pressure sensors 16, 17 and 18, 19 having their pressure-sensitive elements for detecting the air pressure P of the tire of right and left front wheels 5, 5 and right and left rear wheels 11, 11, respectively, the air pressure sensors 16 to 19 all being connected to a computer 12.

There will be described below the constitution as well as the function of a control part of the steering system according to the second embodiment, in conjunction with FIGS. 9 and 10.

Figure 9:
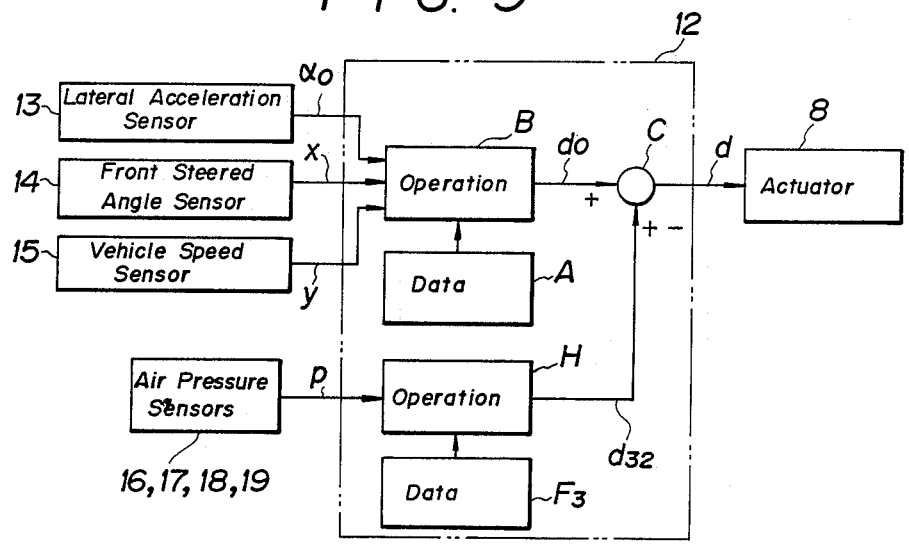
FIG. 9 is a functional block diagram of a control part of the steering system of FIG. 8.

Referring first to FIG. 9, by processing respective detection results of the sensors 13 to 15, an ordinary steering data signal $d_0$ of the rear wheels 11, 11 is obtained through a process similar to that in the first embodiment.

Moreover, from the air pressure sensors 16 to 19, their detection signals p each respectively representing the air pressure P of the tire of a corresponding one of the front and rear wheels 5, 5 and 11, 11 are subjected to an operation process H, where their signal contents are processed, on the basis of data $F_3$ stored in advance, to produce a correction data signal $d_{32}$. The data signal $d_{32}$, which has a positive or negative sign to identify the direction of correction, is then subjected to a synthesis process C for an addition thereof with the ordinary steering data $d_0$, to thereby produce a control signal d to be fed to a servo-actuator 8.

Details of the operation process H will now be described. As described before, with respect to each rear wheel 11, when an air pressure Pr of the tire thereof is reduced lower than a predetermined value, a cornering power Kr thereof becomes smaller corresponding thereto.

Accordingly, when the tire air pressure Pr of the rear wheels 11, 11 as detected by the air pressure sensors 18, 19 is lower than a predetermined value, the cornering power Kr thereof is also smaller than a predetermined value. In this case, the process H produces, on the basis of the data $F_3$, the correction data signal $d_{32}$ so a to additionally steer the rear wheels 11, 11 in the same steering direction as the front wheels 5, 5 by a given corrective steering angle, to thereby increase the slip angle $\beta$ of each rear wheel 11 from an ordinary position it is to have when steered depending on the rear wheel steering data signal $d_0$ only.

On the contrary, when the tire air pressure Pr of the rear wheels 11, 11 has become larger than the predetermined value, then the correction data signal $d_{32}$ is so produced as to additionally steer the rear wheels 11, 11 in the opposite steering direction to the front wheels 5, 5 by a given corrective steering angle, to thereby decrease the slip angle $\beta$ of each rear wheel 11 from the ordinary position it is to have when steered depending on the rear wheel steering data signal $d_0$ only.

Also in this case, the correction data signal $d_{32}$ is determined, based on the data $F_3$ as preset to be stored, so that an actual steered angle $\delta_r$ of the rear wheels 11, 11 can permit the operation of a steering wheel 1 to provide a normal trace for the turning travel of the vehicle.

As a matter of course, the foregoing description is related to a result of a process for the case in which the air pressure P of the tire of the front wheels 5, 5 is assumed to be kept at predetermined level.

In other words, as already described, the front and rear wheels 5, 5 and 11, 11 are each respectively provided with an air pressure sensor, so that the correction data signal $d_{32}$ can be produced in consideration of the tire air pressure P of all the whole wheels 5, 5 and 11, 11.

According to the second embodiment also, the steering system for vehicles is successfully kept free from being affected, in respect of the travelling nature thereof, by variations in the cornering power K of the tire due to changes in the air pressure P of the tire, thus always permitting a stable operation of a steering wheel 1 even during a turning travel, whereby the turning characteristics of the vehicle can be favorably improved. Moreover, in the second embodiment, as the source of a detection signal, there is employed an element for detecting the air pressure P of the tire, from which the cornering power K can be substantially directly derived, so that the reliability in the processed result of the signal is considerably raised, in addition to that a processing program for a computer 12 can be simplified to be shortened, thus effectively contributing to the cost down of the entire system.

Incidentally, because air pressure changes of the tires of the front wheels 5, 5 can be relatively easily felt by a driver and can be likewise corrected, and besides when considering the empirical fact that the load of goods or the weight of a passenger is mainly imposed on the rear wheels 11, 11 and likely to raise the temperature of each rear wheel tire and hence the air pressure Pr thereof, it also appears practically sufficient to provide a suitable air pressure sensor for each of the rear wheels 11, 11 instead of the provision of the air pressure sensors 16 to 19 covering all of the front and rear wheels 5, 5 and 11, 11.

Figure 10:
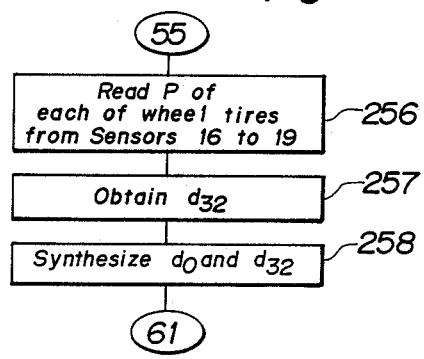
FIG. 10 is a schematic flow chart of an essential part of a program for a microcomputer system of the control part of FIG. 9.

FIG. 10 shows a schematic flowchart of an essential part of the program stored in a memory (not shown) of the microcomputer 12 of the steering system according to the second embodiment, including a series of process stages 256 to 258 adapted to serve in place of the stages 56 to 60 of FIG. 4, while the remaining part of the program is substantially the same as that of FIG. 4.

At the stage 256, the respective detection signals p of all the air pressure sensors 16 to 19 are input to read the air pressure P of tire of the respective wheels 5, 5 and 11, 11, whereas it should be noted that the reference characters p and P refer to all the sensors 16 to 19 and respective tires of the wheels 5, 5 and 11, 11, respectively.

Then, at a stage 257, based on the detected air pressure P of the respective tires as well as the stored data $F_3$, the correction data signal $d_{32}$ is obtained and, at the stage 258, the signal $d_{32}$ is added to the ordinary steering data signal $d_0$. It is needless to say that, in the above description, the data $F_3$ are preset taking into account characteristic curves such as of FIG. 18.

There will now be described below a steering system for vehicles according to the third embodiment of the invention, with reference to FIGS. 11 to 13.

Figure 15:
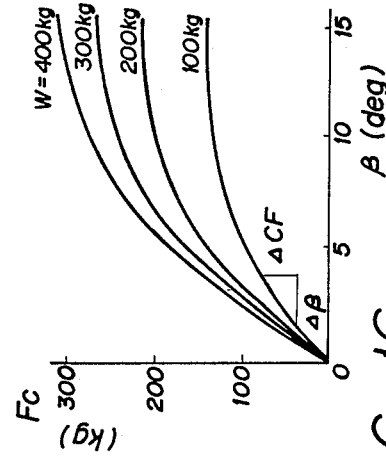

In the third embodiment, as opposed to the first embodiment in which the cornering power K is directly obtained, a vertical load W on the tire of a vehicle is detected to compute therefrom the cornering power K, in consideration of a relation between the cornering power K and the vertical load P of respective tires, such as understood from FIG. 15, thereby realizing favorable control of rear wheel steering.

Figure 11:
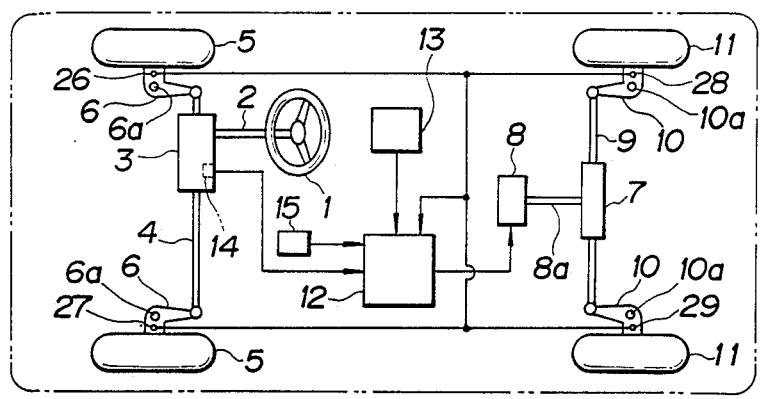
FIG. 11 is a schematic plan view showing a vehicle equipped with a steering system according to a third embodiment of the invention.

Referring now to FIG. 11, in the third embodiment, in place of the air pressure sensors 16 to 19 of the second embodiment, two pairs of load sensors 26, 27 and 28, 29 are provided to detect the vertical load W on the tire of the right and left front wheels 5, 5 and right and left rear wheels 11, 11, respectively, the vertical load sensors 26 to 29 all being connected to a computer 12. In this embodiment, each of the vertical load sensors 26 to 29 comprises a stroke sensor (not shown) for detecting a vertical cushioning stroke of a suspension unit provided for a corresponding one of the front and rear wheels 5, 5 and 11, 11. In this respect, each of the sensors 26 to 29 may comprise a pressure sensor for detecting the vertical load W.

There will be described below the constitution as well as the function of a control part of the steering system according to the third embodiment, in conjunction with FIGS. 12 and 13.

Figure 12:
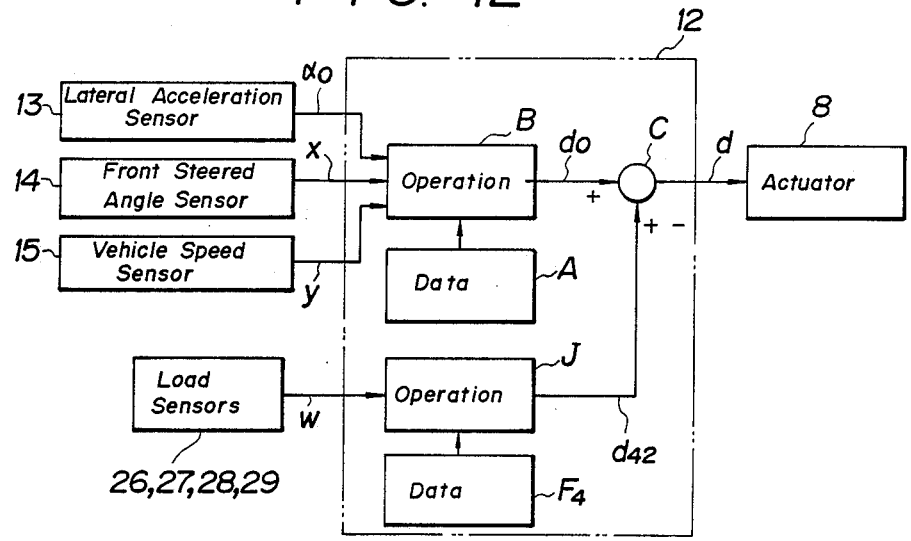
FIG. 12 is a functional block diagram of a control part of the steering system of FIG. 11.

Referring first to FIG. 12, by processing respective detection results of the sensors 13 to 15, an ordinary steering data signal $d_0$ of the rear wheels 11, 11 is obtained through a process similar to that in the first embodiment.

Moreover, from the vertical load sensors 26 to 29, their detection signals w each respectively representing the vertical load W on the tire of a corresponding one of the front and rear wheels 5, 5 and 11, 11 are subjected to an operation process J, where their signal contents are processed, on the basis of data $F_4$ stored in advance, to produce a correction data signal $d_{42}$. The data signal $d_{42}$, which has a positive or negative sign to identify the direction of correction, is then subjected to a synthesis process C for an addition thereof with the ordinary steering data $d_0$, to thereby produce a control signal d to be fed to a servo-actuator 8.

Details of the operation process J will now be described. As described before, with respect to each rear wheel 11, when a vertical load Wr on the tire thereof is reduced lower than a predetermined value, a cornering power Kr thereof becomes smaller corresponding thereto.

Accordingly, when the vertical load Wr of the rear wheels 11, 11 as detected by the vertical load sensors 28, 29 is lower than a predetermined value, the cornering power Kr thereof is also smaller than a predetermined value. In this case, the process J produces, on the basis of the data $F_4$, the correction data signal $d_{42}$ so as to additionally steer the rear wheels 11, 11 in the same steering direction as the front wheels 5, 5 by a given corrective steering angle, to thereby increase the slip angle $\beta$ of each rear wheel 11 from an ordinary position it is to have when steered depending on the rear wheel steering data signal $d_0$ only.

On the contrary, when the vertical load Wr of the rear wheels 11, 11 has become larger than the predetermined value, then the correction data signal $d_{42}$ is so produced as to additionally steer the rear wheels 11, 11 in the opposite steering direction to the front wheels 5, 5 by a given corrective steering angle, to thereby decrease the slip angle $\beta$ of each rear wheel 11 from the ordinary position it is to have when steered depending on the rear wheel steering data signal $d_0$ only.

Also in this case, the correction data signal $d_{42}$ is determined, based on the data $F_4$ as preset to be stored, so that an actual steered angle $\delta_r$ of the rear wheels 11, 11 can permit the operation of a steering wheel 1 to provide a normal trace for the turning travel of the vehicle.

As a matter of course, the foregoing description is related to a result of a process for the case in which the vertical load W on the tire of the front wheels 5, 5 is assumed to be kept at a predetermined level.

In other words, as already described, the front and rear wheels 5, 5 and 11, 11 are each respectively provided with a vertical load sensor, so that the correction data signal $d_{42}$ can be produced in consideration of the vertical load W on the tire of all the wheels 5, 5 and 11, 11.

According to the third embodiment also, the steering system for vehicles is successfully kept free from being affected, in respect of the travelling nature thereof, by variations in the cornering power K of tire due to changes in the vertical load W on the tire, thus always permitting a stable operation of a steering wheel 1 even during a turning travel, whereby the turning characteristics of the vehicle can be favorably improved. Moreover, in the third embodiment, as the source of a detection signal, there is employed an element for detecting the vertical load W on the tire, from which the cornering power K can be substantially directly derived, so that the reliability in the processed result of the signal is considerably raised, and in addition a processing program for the computer 12 can be simplified to be shortened, thus effectively contributing to the cost down of the entire system.

Incidentally, when considering the empirical fact that the load of goods or the weight of a passenger is mainly imposed on the rear wheels 11, 11 as described before, it also appears practically sufficient to provide a suitable vertical load sensor for either or both of the rear wheels 11, 11 instead of the provision of the vertical load sensors 26 to 29 covering all of the front and rear wheels 5, 5 and 11, 11.

Figure 13:
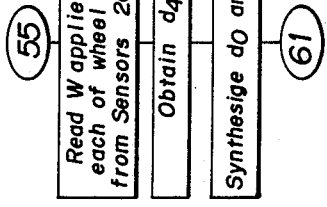
FIG. 13 is a schematic flow chart of an essential part of a program for a microcomputer system of the control part of FIG. 12.
Figure 14:
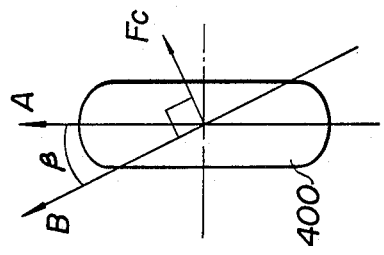

FIG. 13 shows a schematic flowchart of an essential part of the program stored in a memory (not shown) of the micro computer 12 of the steering system according to the third embodiment, including a series of process stages 356 to 358 adapted to serve in place of the stages 56 to 60 of FIG. 4, while the remaining part of the program is substantially the same as that of FIG. 4.

At the stage 356, the respective detection signals w of all the vertical load sensors 26 to 29 are input to read the vertical load W on the tire of the respective wheels 5, 5 and 11, 11, whereas it should be noted that the reference characters w and W refer to all the sensors 26 to 29 and respective tires of the wheels 5, 5 and 11, 11, respectively.

Then, at a stage 357, based on the detected vertical load W on the respective tires as well as the stored data $F_4$, the correction data signal $d_{42}$ is obtained and, at the stage 358, the signal $d_{42}$ is added to the ordinary steering data signal $d_0$. It is needless to say that, in the above description, the data $F_4$ are preset taking into account a relation between the cornering power K and the vertical load W, such as of FIG. 15.

Incidentally, in each of the foregoing embodiments of the invention, each memory for storing the data A, F, $F_2$, $F_3$, or $F_4$ may comprise a ROM or a magnetic disc or the like.

Moreover, in the foregoing embodiments, as a sensor for detecting a turning state representative quantity of the vehicle, there may be employed a yaw acceleration sensor instead of or in addition to the lateral acceleration sensor.

Further, as a matter of course, the foregoing embodiments may be combined in a voluntary manner to substantiate a steering system for vehicles of higher grade.

Furthermore, as easily understood, the scope of application of the present invention is not limited to a steering system for vehicles according to the aforesaid prior art, but covers other steering systems for vehicles proposed such as in Japanese patent application No. 57-134888 filed on Aug. 2, 1982 and laid open on Feb. 10, 1984 as JP-A-No. 59-26363, for example. In a steering system for vehicles according to such Japanese Laid Open Application JP-A-No. 59-26363, a rear wheel has a steered angle thereof not directly computed by a computer but controlled with a computer such that a ratio of the steered angle of the rear wheel to that of a front wheel changes in accordance with the magnitude of a vehicle speed.

Accordingly, in the application to such a steering system for vehicles, the present invention may be so embodied that a steered angle ratio of a rear wheel to a front wheel is controlled in consideration of a cornering power, to follow the concept of the present invention that the influence of variations in the cornering power to a steering operation of a driver should be reduced.

For example, when applied to the aforesaid Japanese Laid Open Application steering system according to the JP-A-No. 59-26363 in which the steered angle ratio has a value thereof signed to be positive for a region of relatively high values of the vehicle speed, the present invention may be so embodied that, in such a vehicle speed region, a steered angle ratio of a rear wheel to a front wheel is controlled to have a larger positive value than a given value, so as to increase a slip angle of the rear as the front wheel is steered, when a cornering power of the rear wheel has become smaller than a predetermined value.

Still more, in the foregoing description not referring to the drive system of those vehicles to which the present invention is applicable, it will be apparent that such a vehicle may be of a front-engine, rear drive type, a front engine, front drive type, a four-wheel drive type, or any other suitable type, provided a consideration is given to a steering characteristic peculiar to such drive system.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

We claim:

1. A steering system for a vehicle having a steerable front wheel and a steerable rear wheel, comprising:
    a front wheel steering mechanism for steering said front wheel;
    a rear wheel steering mechanism for steering said rear wheel in dependence on travelling state quantities of said vehicle; and
    said rear wheel steering mechanism (7, 8, 9, 10, 12, 13, 14, 15) including:
        actuation means (7, 8, 9, 10) for actuating said rear wheel;
        detection means (13, 14, 15) for detecting said travelling state quantity ($\delta_f$, V, $\alpha_a$);

control means (12) connected to said detection means and adapted to supply a control signal (d) to said actuation means; and said control means having:
- first process means (A, B) receiving an output signal (x, y, $\alpha_0$) from said detection means to produce a first signal ($d_0$) representing an ordinary steering angle for said rear wheel;
- second process means (13, 14, 15, D, E, F, G) also receiving said output signal (X, Y, $\alpha_0$) from said detection means for deriving data ($K_r$, $\mu_r$, $P_r$, $W_r$)) relating to at least a cornering power ($K_r$) of said rear wheel and for producing a second signal ($d_2$) for correcting said first signal on the basis of said data; and
- synthesizing means (C) for synthesizing said first signal and said second signal to produce said control signal.

2. A steering system according to claim 1, wherein:
said second process means is adapted to produce, when a ratio of said cornering power of said rear wheel to a vertical load of said rear wheel is larger than a predetermined value, said second signal so as to steer said rear wheel, additionally with respect to said ordinary steering angle, in the opposite direction to a steering direction of said front wheel, to decrease a slip angle of said rear wheel while said vehicle is turning.

3. A steering system according to claim 1, wherein:
said second process means is adapted to produce, when a ratio of said cornering power of said rear wheel to a vertical load of said rear wheel is smaller than a predetermined value, said second signal so as to steer said rear wheel, additionally with respect to said ordinary steering angle, in the same direction as a steering direction of said front wheel, to increase a slip angle of said rear wheel while said vehicle is turning.

4. A steering system according to claim 1, wherein:
said second process means is adapted to produce said second signal so as to steer said rear wheel, additionally with respect to said ordinary steering angle, in the opposite direction to a steering direction of said front wheel to decrease a slip angle of said rear wheel while said vehicle is turning, when a ratio of said cornering power of said rear wheel to a vertical load of said rear wheel is larger than a predetermined value, and in the same direction as said steering direction of said front wheel to increase said slip angle of said rear wheel while said vehicle is turning, when said ratio of said cornering power of said rear wheel to said vertical load of said rear wheel is smaller than said predetermined value.

5. A steering system according to claim 4, wherein:
said control means comprises a computer system (12) mounted on said vehicle having at least a memory; said computer system being connected to said detection means and to said actuation means.

6. A steering system according to claim 5, wherein:
said first process means comprises given data (A) on various travelling states of said vehicle and a first operation program (B) for producing said first signal on the basis of said output signal from said detection means and of said given data, said given data and said first operation program being stored in said memory of said computer system, respectively; and said synthesizing means comprises an addition program (C) stored in said memory of said computer system.

7. A steering system according to claim 6, wherein:
said second process means receives said output signal from said detection means; and
said second process means comprises:
- a conversion process program (D) for computing a plurality of values ($\alpha_i$) of a lateral acceleration ($\alpha$) of said vehicle corresponding to a variety of probable values ($K_i$) of said cornering power (K), on the basis of at least a first component (x, y) of said output signal from said detection means relating to a steered angle ($\delta_f$) of said front wheel and to a vehicle speed (V) of said vehicle;
- a comparison process program (E) for comparing said values thus computed of said lateral acceleration with a second component ($\alpha_0$) of said output signal from said detection means relating to an actual value ($\alpha_a$) of said lateral acceleration, to determine an actual value ($K_r$) of said cornering power of at least said rear wheel;
- a second operation program (G) for producing said second signal ($d_2$), on the basis of a signal ($d_1$) relating to said actual value thus determined of said cornering power and of given data (F) on various values of said cornering power; and
- said conversion process program, said comparison process program, and said second operation program being stored in said memory of said computer system, respectively.

8. A steering system according to claim 6, wherein:
said second process means receives said output signal from said detection means; and
said second process means comprises:
- a conversion process program ($D_2$) for computing a plurality of values ($\alpha_i$) of a lateral acceleration ($\alpha$) of said vehicle corresponding to a variety of probable values ($\mu_i$) of a coefficient ($\mu$) of friction between a tire of said vehicle and the road surface, on the basis of at least a first component (x, y) of said output signal from said detection means relating to a steered angle ($\delta_f$) of said front wheel and to a vehicle speed (V) of said vehicle;
- a comparison process program ($E_2$) for comparing said values thus computed of said lateral acceleration with a second component ($\alpha_0$) of said output signal from said detection means relating to an actual value ($\alpha_a$) of said lateral acceleration, to determine an actual value ($\mu_r$) of said coefficient of friction between at least a tire of said rear wheel and and the road surface,
- a second operation program ($G_2$) for producing said second signal ($d_{22}$), on the basis of a signal ($d_{2i}$) relating to said actual value thus determined of said coefficient of friction and of given data ($F_2$) on various values of said coefficient of friction; and
- said conversion process program, said comparison process program, and said second operation program being stored in said memory of said computer system, respectively.

9. A steering system according to claim 6, wherein:
said second process means comprises:
- air pressure detection means (16, 17, 18, 19) for detecting an air pressure ($P_r$) of a tire of at least said rear wheel;

a second operation program (H) for producing said second signal ($d_{32}$), on the basis of a signal (p) from said air pressure detection means relating to said air pressure of said tire and of given data ($F_3$) on various values of said air pressure; and said second operation program being stored in said memory of said computer system.

10. A steering system according to claim 6, wherein: said second process means comprises:

vertical load detection means (26, 27, 28, 29) for detecting a vertical load (Wr) of at least said rear wheel;

a second operation program (J) for producing said second signal ($d_{42}$), on the basis of a signal (w) from said vertical load detection means relating to said vertical load and of given data ($F_4$) on various values of said vertical load; and said second operation program being stored in said memory of said computer system.

11. A steering system according to claim 10, wherein: said vertical load detection means comprises a stroke sensor (26, 27, 28, 29) for detecting a vertical stroke of a suspension unit for at least said rear wheel.

12. A steering system according to claim 1, further including:

select means (Sw) for manually selecting an override mode in which said control signal has a component thereof forced to change so as to render a slip angle ($\beta$) of said rear wheel smaller than it would be in a normally controlled mode of the steering system.

* * * * *

UNITED STATES PATENT AND TRADEMARK OFFICE
CERTIFICATE OF CORRECTION

PATENT NO. : 4,964,481

DATED : OCTOBER 23, 1990

INVENTOR(S) : Sano et al.

It is certified that error appears in the above-identified patent and that said Letters Patent is hereby corrected as shown below:

Column 2, line 10, after "angle" insert --$\beta$.--;
        line 30, change "$\mu$is" to --$\mu$ is--.
Column 3, line 51, change "itself" to --itself,--.
Column 4, line 29, delete "the" (first occurrence);

line 56, change "respectively,." to --respectively,--.
Column 5, line 19, change "t herewith" to --therewith--.
Column 6, line 52, change "the alternate long and two short dashes line," to --dashed line in--.
Column 8, line 39, change "description" to --description,--.
Column 13, line 5, delete "whole";
        . line 66, change "P" to --W--.
Column 16, lines 25 and 26, change "aforesaid Japanese Laid Open Application steering system according to the" to --steering system according to the aforesaid Japanese Laid-Open Application--;
        line 42, delete "a".
Column 18, line 53 (Claim 8, line 21), delete "and" (second occurrence); change the comma to a semicolon.

Signed and Sealed this

Twenty-sixth Day of May, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,964,481

DATED : October 23, 1990

INVENTOR(S) : Shoichi Sano, et al

It is certified that error appears in the above-identified patent and that said Letters Patent is hereby corrected as shown below:

Col. 4, line 30, after "characteristic of" insert --the--

Signed and Sealed this

First Day of June, 1993

Attest:

MICHAEL K. KIRK

Attesting Officer

Acting Commissioner of Patents and Trademarks